US012064958B2

(12) United States Patent
Choi

(10) Patent No.: US 12,064,958 B2
(45) Date of Patent: Aug. 20, 2024

(54) HYBRID INKJET PRINTER CAPABLE OF CONTINUOUS OUTPUT

(71) Applicant: DILLI CO., LTD., Dongducheon-si (KR)

(72) Inventor: Geunsoo Choi, Seoul (KR)

(73) Assignee: DILLI CO., LTD., Dongducheon-si (KR)

( * ) Notice: Subject to any disclaimer, the term of this patent is extended or adjusted under 35 U.S.C. 154(b) by 0 days.

(21) Appl. No.: 17/913,951

(22) PCT Filed: Oct. 14, 2021

(86) PCT No.: PCT/KR2021/014178
§ 371 (c)(1),
(2) Date: Sep. 23, 2022

(87) PCT Pub. No.: WO2023/286920
PCT Pub. Date: Jan. 19, 2023

(65) Prior Publication Data

US 2024/0208250 A1 Jun. 27, 2024

(30) Foreign Application Priority Data

Jul. 13, 2021 (KR) ........................ 10-2021-0091606

(51) Int. Cl.
*B41J 11/00* (2006.01)
*B41J 13/03* (2006.01)

(52) U.S. Cl.
CPC ........ *B41J 11/0085* (2013.01); *B41J 11/0035* (2013.01); *B41J 11/0045* (2013.01); *B41J 11/007* (2013.01); *B41J 13/03* (2013.01)

(58) Field of Classification Search
CPC . B41J 11/0085; B41J 11/0035; B41J 11/0045; B41J 11/007
See application file for complete search history.

(56) References Cited

U.S. PATENT DOCUMENTS 6,619,795 B1 9/2003 Hiramatsu

FOREIGN PATENT DOCUMENTS

| | | | |
|---|---|---|---|
| JP | 2000-351477 A | 12/2000 |
| KR | 2000-0009255 A | 2/2000 |
| KR | 10-0566108 B1 | 3/2006 |
| KR | 10-2009-0018337 A | 2/2009 |

OTHER PUBLICATIONS

International Search Report for PCT/KR2021/014178 dated Mar. 24, 2022.

*Primary Examiner* — Julian D Huffman
(74) *Attorney, Agent, or Firm* — Sughrue Mion, PLLC

(57) ABSTRACT

The present disclosure relates to a hybrid inkjet printer capable of continuous output, which is configured to perform printing while an output medium is input to an input unit and then moved to an output unit, and to be able to press the surface of an output medium to correspond to the thickness of the output medium at the input unit and the output unit, thereby being able to perform continuous output, stably move an output medium, and minimize poor printing.

6 Claims, 11 Drawing Sheets

HYBRID INKJET PRINTER CAPABLE OF CONTINUOUS OUTPUT

BACKGROUND OF THE INVENTION

Field of the Invention

The present disclosure relates to a hybrid inkjet printer capable of continuous output. In more detail, the present disclosure relates to a hybrid inkjet printer capable of continuous output, the hybrid inkjet printer configured to perform printing while an output medium is input to an input unit and then moved to an output unit, and to be able to press the surface of an output medium to correspond to the thickness of the output medium at the input unit and the output unit, thereby being able to perform continuous output, stably move an output medium, and minimize poor printing.

Description of the Related Art

Recently, it is possible to perform printing not only on paper or thin plastic paper, which are common output media of the related art, but on various output media such as a wood plate, a glass plate, and a slate with the development of printers.

Such technological progress was made by using a printer or UV ink in a printer. UV ink has a property that it adheres as long as it is exposed to ultraviolet light after sprayed on an output medium, so there is no limitation in the target output media.

In particular, the interest in outputting on a hard plate-shaped output medium rather than existing flexible paper was increased.

The reason is because outdoor signboards, interior/exterior materials, etc. depend on photorealistic output such as silk screen printing in the related art, so not only the process is complicated and a lot of time and costs are required, the state is not but output satisfactory.

Accordingly, as output media were diversified, the thickness of the output media was also diversified.

Accordingly, a flat type plotter was developed to perform printing on plate-shaped output media.

However, such a flat type plotter employs a vacuum suction type to fix a medium, but it is not preferable to convey an output medium while applying suction force using an suction plate for vacuum suction because friction exists between the suction plate and the output medium.

If vacuum suction is stopped every time an output medium is conveyed and vacuum suction is started again after conveying, it not is inconvenient and the time for outputting also increases.

Accordingly, a head should output a desired image on an output medium while making plane motion in a horizontal plane with the output medium fixed over the suction plate, but this method has a defect that the structure for operating the head is complicated and the head is excessively increased in size, whereby the manufacturing process of a printer is also increased.

Therefore, it is required to develop a printer having a unit that can convey an output medium over the suction plate to be suitable for a printer having a head unit that only straightly reciprocates.

A flat bed printer has been proposed in Korean Patent Application No. 10-2005-0013291 (Korean Patent No. 10-0566108) in consideration of this matter.

A common flat bed printer of the related art includes a bed that has a channel therein and air suction holes on the top, a frame that is integrally fixed to the bed and supporting the bed, a driving roller and a driven roller that are fixed to a roller bracket integrally fixed to the frame and are installed ahead of or behind the bed, a driving unit that applies torque to the driving roller, a conveying belt that is held on the conveying roller to rotate, has a bottom moving over the bed, and is formed in a ventilation structure, an air suction unit that is connected to the channel ad suctions air from the inside of the bed, and a head bar that guides a head to horizontally move on the bed and has a height that can be vertically adjusted, in which the bed is formed in a box shape having a top plate with a several air suction holes and being open upward, has the channel at a side, and has several separators to form a passage with an open side, and a switch valve is installed in each of the open passages of the separators and includes a housing formed to communicate with the channel.

However, according to this common flat bed printer of the related art, due to the components described above, a porous conveying belt is installed over the bed capable of vacuum suction, so an output medium can be conveyed in a suctioned state. Accordingly, it is possible to solve the problem that when an output medium is conveyed in a printer with a head unit fixed, a vacuum suction state is removed and then the output medium is conveyed. However, there is a defect that since a pushing roller is not configured to press an output medium to correspond to the thickness of the output medium, an output medium can be stably moved, so poor printing may be generated when an output medium is printed.

SUMMARY OF THE INVENTION

Accordingly, the present disclosure has been made in an effort to solve the problems described above and an objective of the present disclosure is to provide a hybrid inkjet printer capable of continuous output, the hybrid inkjet printer configured to perform printing while an output medium is input to an input unit and then moved to an output unit, and to be able to press the surface of an output medium to correspond to the thickness of the output medium at the input unit and the output unit, thereby being able to perform continuous output, improve productivity, stably move an output medium, and minimize poor printing.

Other objectives of the present disclosure will be made clear through description.

In order to achieve the objectives of the present disclosure, a hybrid inkjet printer capable of continuous output includes: a frame that is horizontally installed on a floor to set another output medium while an output medium is being printed such that the set output medium can be continuously automatically printed simultaneously completion of printing of the output medium that is being printed; a conveying mesh belt that is wound on a pair of conveying rollers spaced apart from each other and being rotated by a driving motor over the frame and is provided to convey an output medium that is fed to be printed on a surface; a vacuum suction unit that is installed under the conveying mesh belt, is positioned between the conveying rollers, and being able to vacuum-suction an output medium that is conveyed by a vacuum generator that is controlled to operate by a controller; a rail bar for a head that is fixed to the front and rear ends of the frame at a first end and a second end, is longitudinally installed at a predetermined distance from the top of the conveying mesh belt, and can be divided into a feed part and a discharge part of an output medium; a head unit that is installed at the rail bar for a head and can print a surface of an output unit while straightly reciprocating along the rail bar for a head to correspond to information input through a display unit; a setting member that is installed on the top of the frame to be able to move up and down, is positioned at the feed part, and can correspond to extension due to heat while uniformly setting an end of an output medium that is fed; a feeding-pressing unit that is installed on the top of the frame to be able to move up and down, is positioned ahead of the setting member, and is operated to correspond to control of the controller to operate and press the top of an output medium when a foot switch is pressed such that the output unit can be stably fed before moving onto the vacuum suction unit; a planarizing-pressing unit that is installed on the top of the frame to be able to move up and down, is positioned behind the setting member, and presses the top of an output medium, which is being conveyed while the surface thereof is printed by the head unit, to correspond to a thickness such that the output medium is planarized and the surface of the output medium can be stably printed; and a discharging-pressing unit that is installed on the top of the frame to be able to move up and down, is positioned at the discharge part, and presses the top of an output medium to correspond to a thickness until the output medium is completely discharged after passing the vacuum suction unit while the surface of the output medium finishes being printed such that the output medium can be stably discharged.

The hybrid inkjet printer further includes a feeding-tension roller of which a first end and a second end are connected to feeding-operation cylinders installed at both sides on the top of the frame to be positioned between the setting member and the planarizing-pressing unit to move up and down and press a fed output medium to correspond to driving of the feeding-operation cylinders such that the output medium is fed always in a tensioned state and poor printing can be minimized.

The hybrid inkjet printer further includes a discharging-tension roller of which an end and another end are connected to discharging-operation cylinders installed at both sides on the top of the frame to be positioned at a side of the discharging-pressing unit to move up and down and press an output medium, which is discharged, to correspond to driving of the discharging-operation cylinders such that the output medium can be discharged always in a tensioned state.

As described above, according to the hybrid inkjet printer capable of continuous output of the present disclosure, there is an effect that when an output medium is set at the setting member and then the foot switch is pressed, printing is performed while the output medium is input to the input unit and moved to the output part to correspond to control of the controller, so continuous output is possible and productivity can be improved. Further, since it is possible to press a surface of an output medium to correspond to the thickness of the output medium by the feeding-pressing unit and the planarizing-pressing unit installed on the top of the conveying mesh belt, an output medium can be stably moved and a poor quality ratio in printing of an output medium can be reduced.

BRIEF DESCRIPTION OF THE DRAWINGS

The above and other objectives, features and other advantages of the present invention will be more clearly understood from the following detailed description when taken in conjunction with the accompanying drawings, in which.

DETAILED DESCRIPTION OF THE INVENTION

Figure 1:
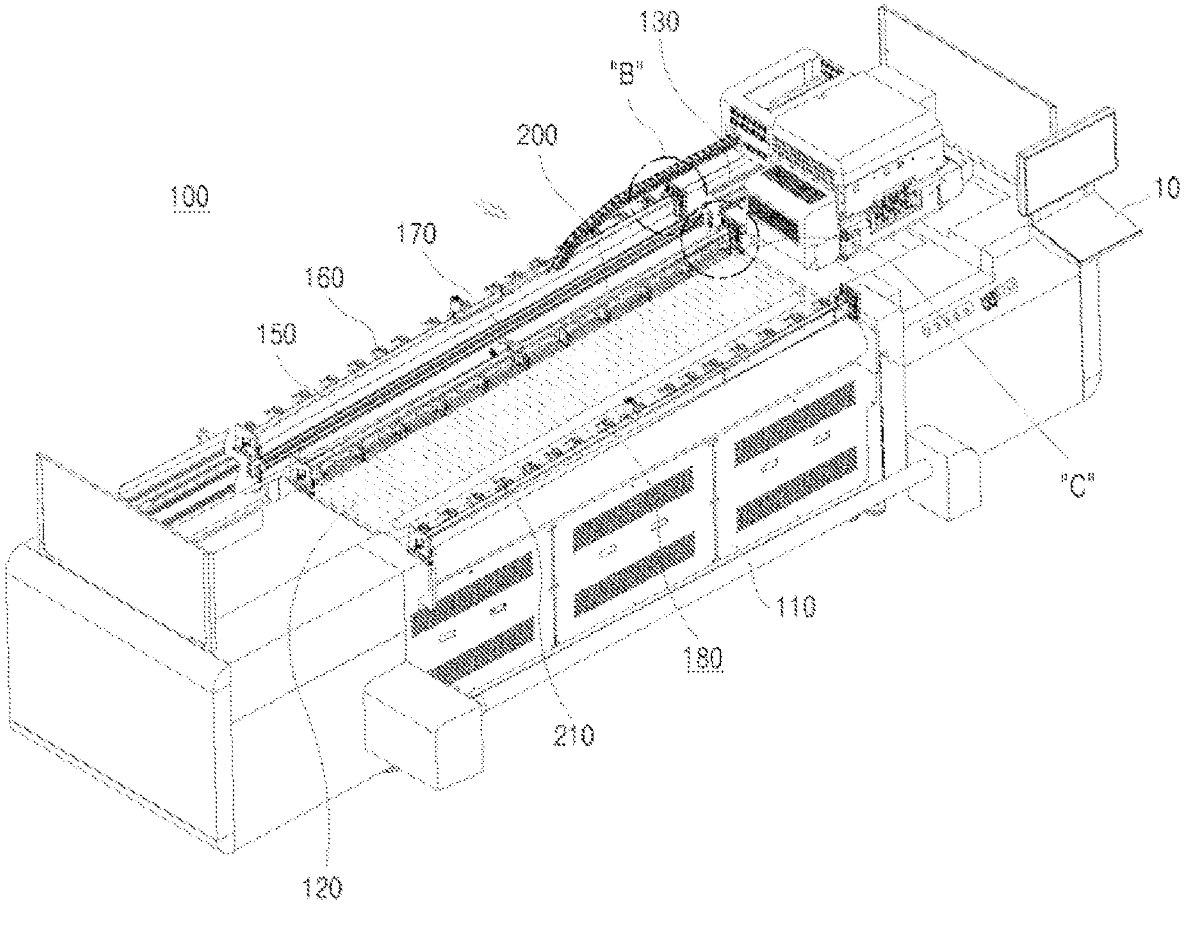
FIG. 1 is a perspective view showing a hybrid inkjet printer capable of continuous output according to the present disclosure.

Hereafter, an embodiment of a hybrid inkjet printer capable of continuous output according to the present disclosure is described in detail.

First, it should be noted that the same components or parts are given the same reference numerals if possible. In the description of the present disclosure, detailed description of well-known relevant functions or configurations is omitted not to make the spirit of the present disclosure unclear.

As shown in the figures, a hybrid inkjet printer 100 capable of continuous output according to the present disclosure includes: a frame 110 that is horizontally installed on a floor to set another output medium while an output medium 10 is being printed such that the set output medium can be continuously automatically printed simultaneously completion of printing of the output medium that is being printed; a conveying mesh belt 120 that is wound on a pair of conveying rollers spaced apart from each other and being rotated by a driving motor (not shown) over the frame 110 and is provided to convey an output medium 10 that is fed to be printed on a surface; a vacuum suction unit 125 that is installed under the conveying mesh belt 120, is positioned between the conveying rollers, and being able to vacuum-suction an output medium that is conveyed by a vacuum generator (not shown) that is controlled to operate by a controller; a rail bar 130 for a head that is fixed to the front and rear ends of the frame 110 at a first end and a second end, is longitudinally installed at a predetermined distance from the top of the conveying mesh belt 120, and can be divided into a feed part and a discharge part of an output medium; a head unit 140 that is installed at the rail bar 130 for a head and can print a surface of an output unit while straightly reciprocating along the rail bar 130 for a head to correspond to information input through a display unit; a setting member 150 that is installed on the top of the frame 110 to be able to move up and down, is positioned at the feed part, and can correspond to extension due to heat while uniformly setting a first end of an output medium that is fed; a feeding-pressing unit 160 that is installed on the top of the frame 110 to be able to move up and down, is positioned ahead of the setting member 150, and is operated to correspond to control of the controller to operate and press the top of an output medium when a foot switch (not shown) is pressed such that the output unit can be stably fed before moving onto the vacuum suction unit 125; a planarizing-pressing unit 170 that is installed on the top of the frame 110 to be able to move up and down, is positioned behind the setting member 150, and presses the top of an output medium, which is being conveyed while the surface thereof is printed by the head unit 140, to correspond to a thickness such that the output medium is planarized and the surface of the output medium can be stably printed; and a discharging-pressing unit 180 that is installed on the top of the frame 110 to be able to move up and down, is positioned at the discharge part, and presses the top of an output medium to correspond to a thickness until the output medium is completely discharged after passing the vacuum suction unit 125 while the surface of the output medium finishes being printed such that the output medium can be stably discharged.

Further, the feed part and the discharge part of the hybrid inkjet printer are configured such that two sheets of output media can be simultaneously fed and then output at left and right sides after surface of the fed output media are simultaneously printed.

The hybrid inkjet printer further includes a feeding-tension roller 200 of which a first end and a second end are connected to feeding-operation cylinders installed at both sides on the top of the frame 100 to be positioned between the setting member 150 and the planarizing-pressing unit 160 to move up and down and press a fed output medium to correspond to driving of the feeding-operation cylinders such that the output medium is fed always in a tensioned state and poor printing can be minimized.

The hybrid inkjet printer further includes a discharging-tension roller 210 of which an end and another end are connected to discharging-operation cylinders installed at both sides on the top of the frame 100 to be positioned at a side of the discharging-pressing unit 180 to move up and down and press an output medium, which is discharged, to correspond to driving of the discharging-operation cylinders such that the output medium can be discharged always in a tensioned state.

Figure 2:
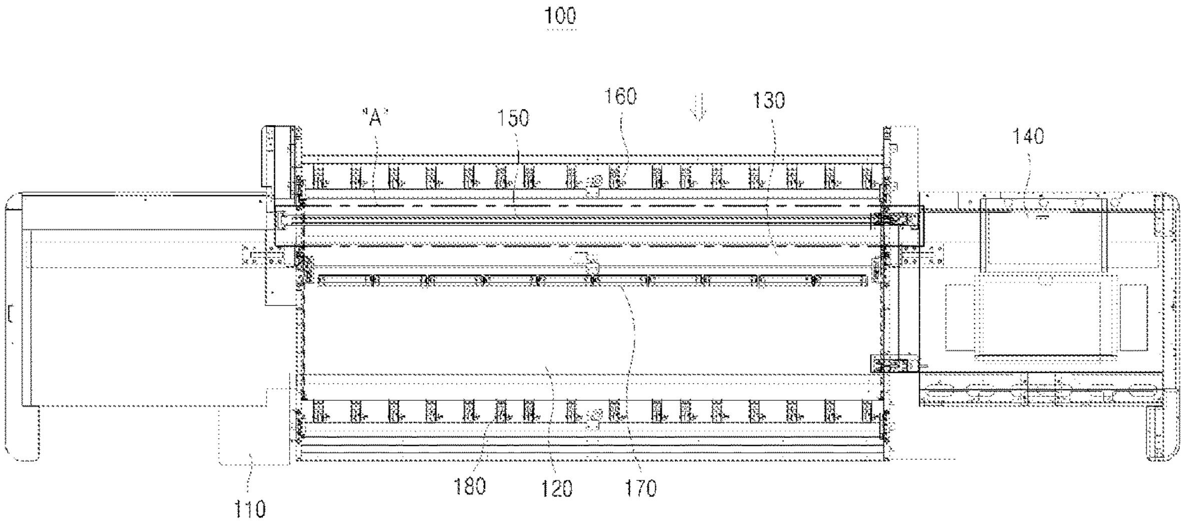
FIG. 2 is a plan view showing the hybrid inkjet printer capable of continuous output according to the present disclosure.
Figure 3:
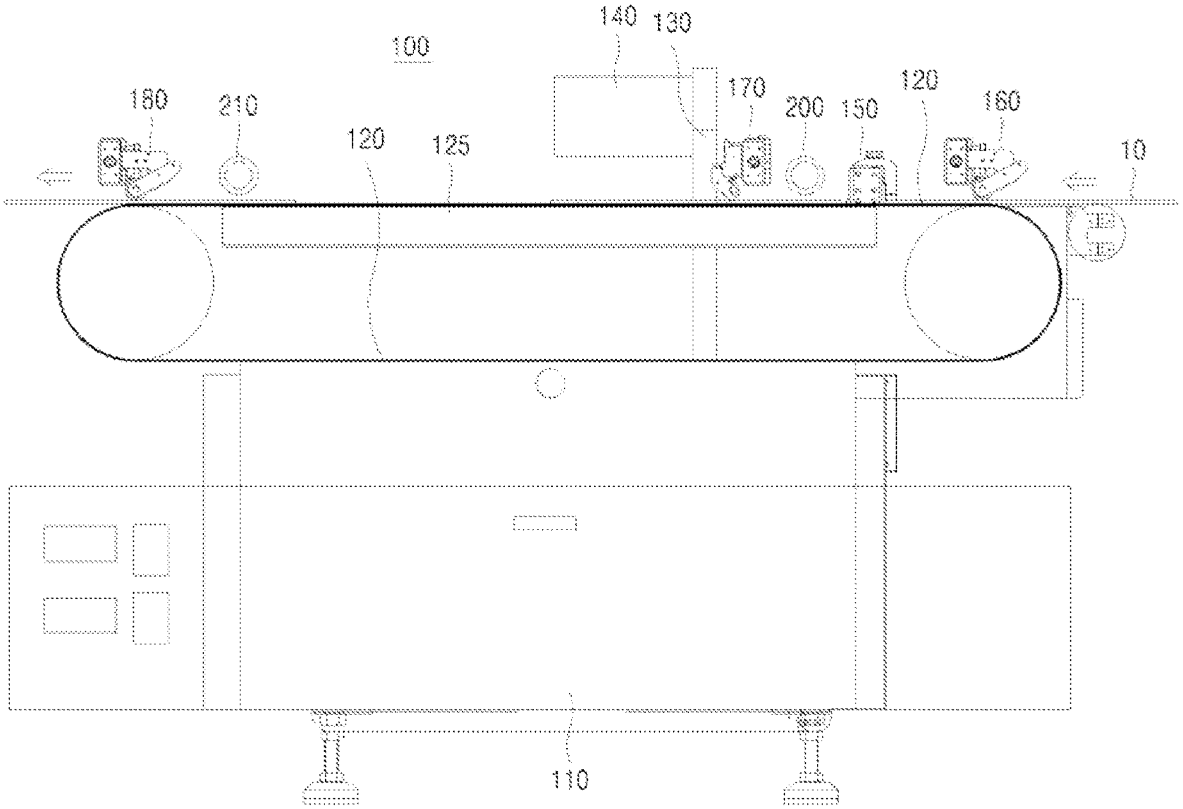
FIG. 3 is a side view showing the hybrid inkjet printer capable of continuous output according to the present disclosure.
Figure 4:
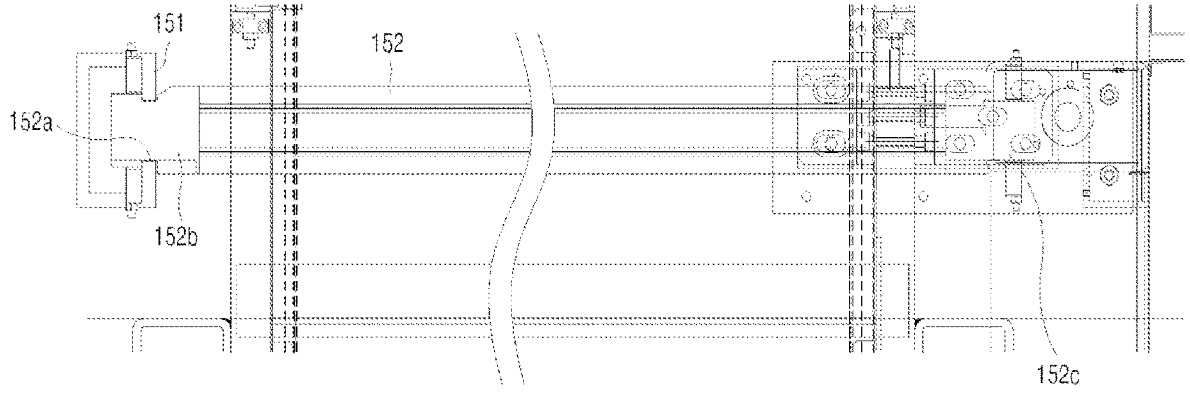
FIG. 4 is a vertical cross-sectional view showing the hybrid inkjet printer capable of continuous output according to the present disclosure.
Figure 5:
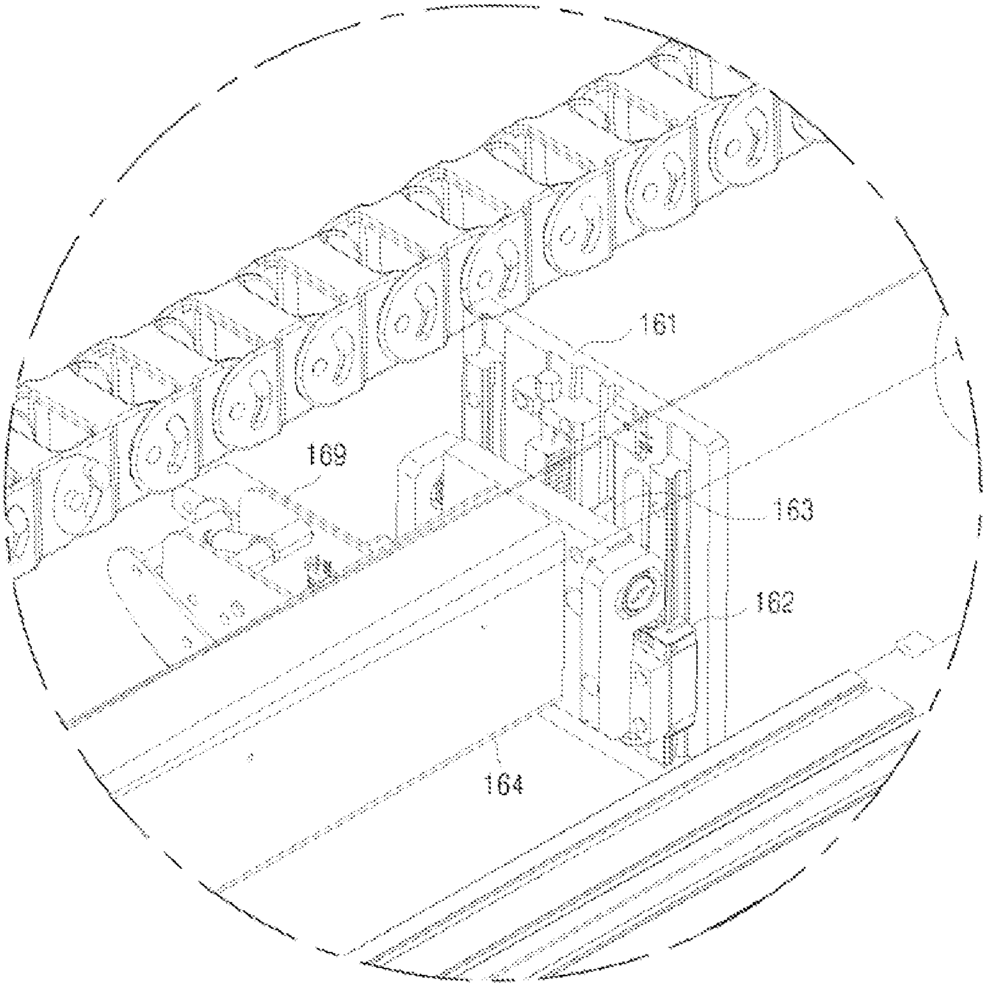
FIG. 5 is an enlarged view of the portion "A" of FIG. 2.
Figure 6:
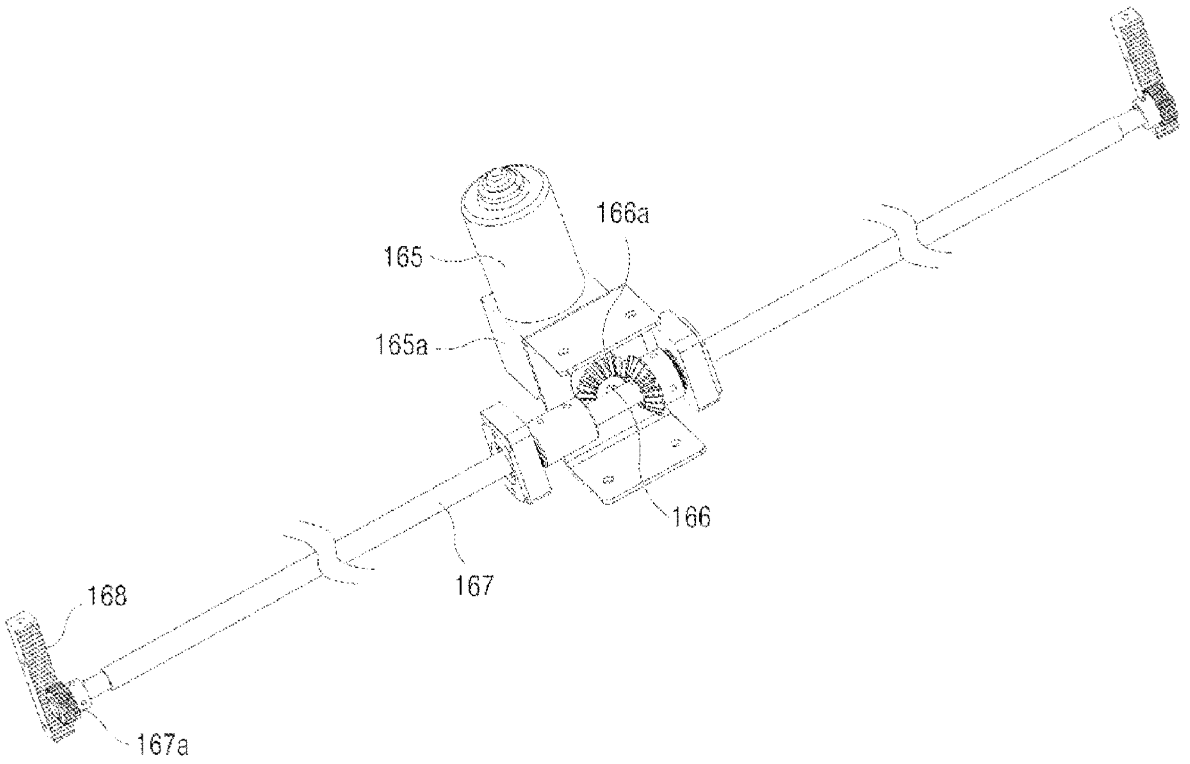
FIG. 6 is an enlarged view of the portion "B" of FIG. 1.
Figure 7:
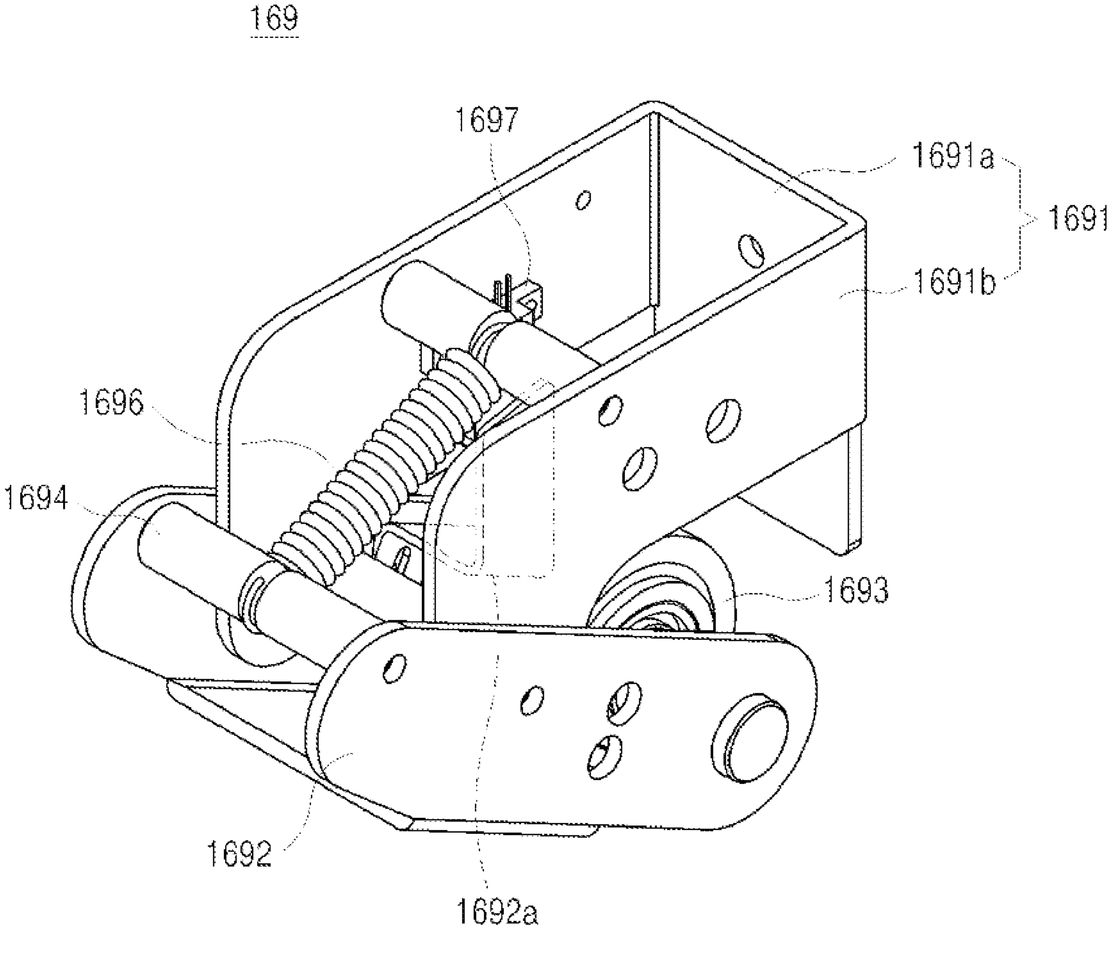
FIG. 7 is a view showing a power transmission unit of a feeding-pressing unit of the hybrid inkjet printer capable of continuous output according to the present disclosure.
Figure 8:
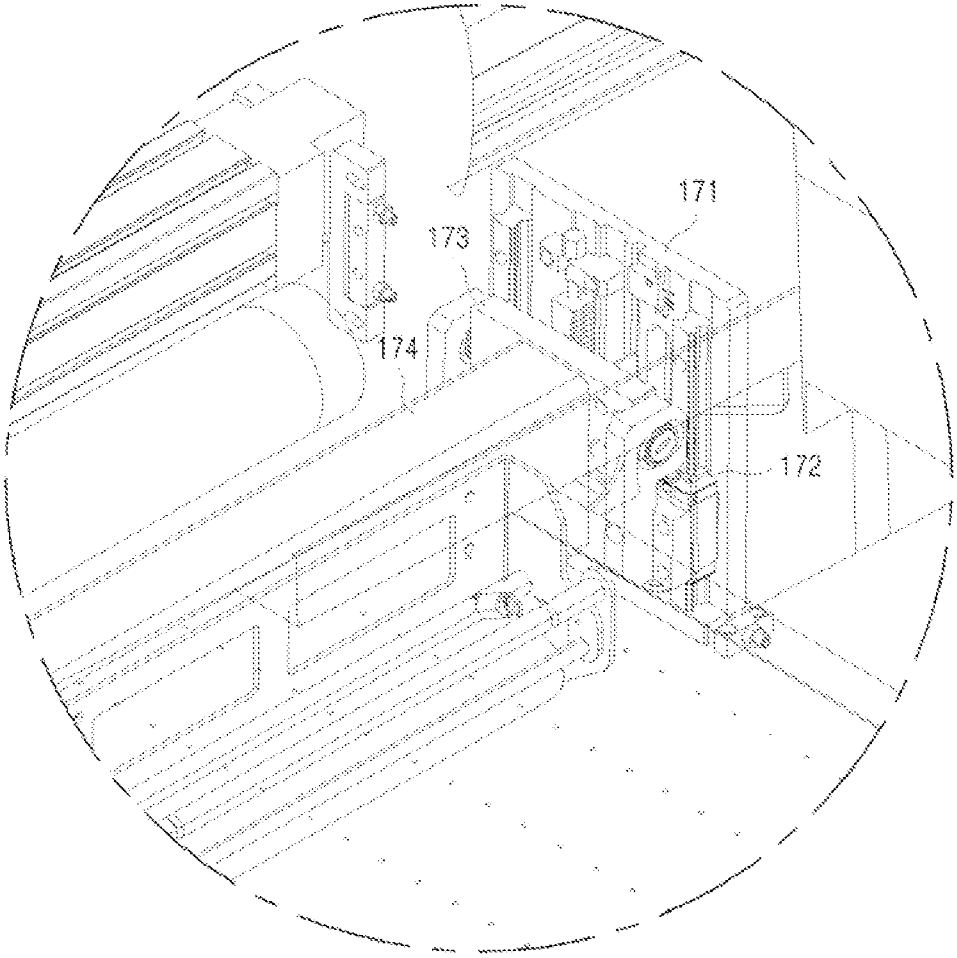
FIG. 8 is a view showing a feeding-pressing roller unit of the feeding-pressing unit of the hybrid inkjet printer capable of continuous output according to the present disclosure.
Figure 9:
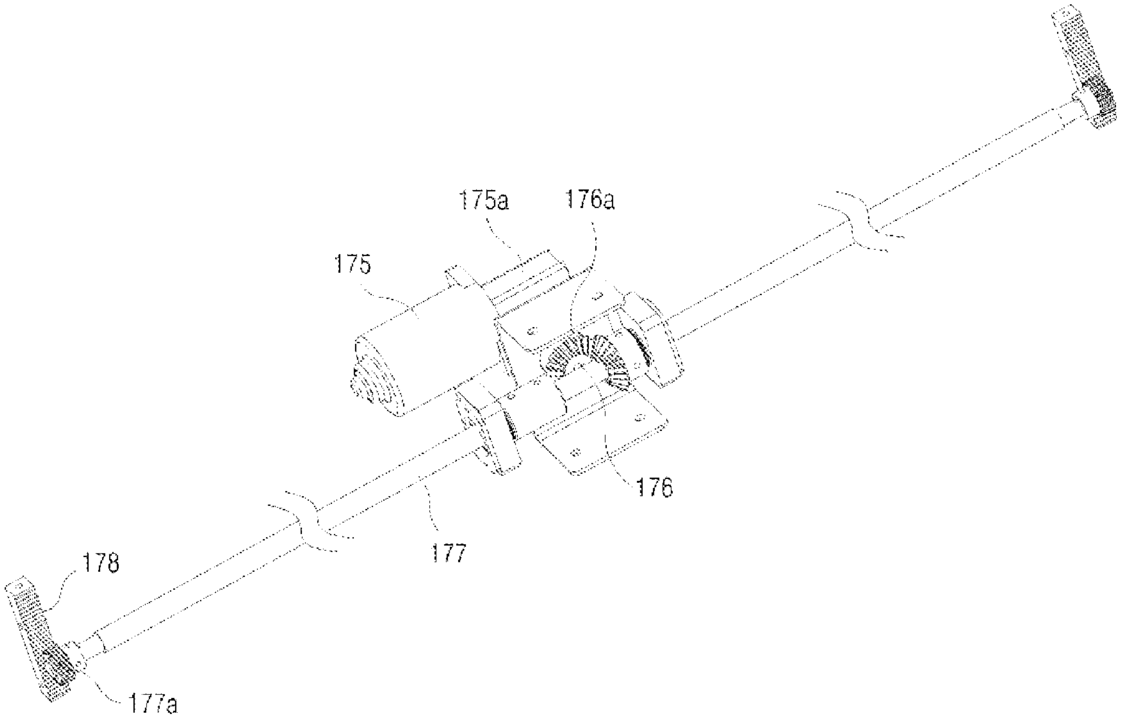
FIG. 9 is an enlarged view of the portion "C" of FIG. 1.
Figure 10:
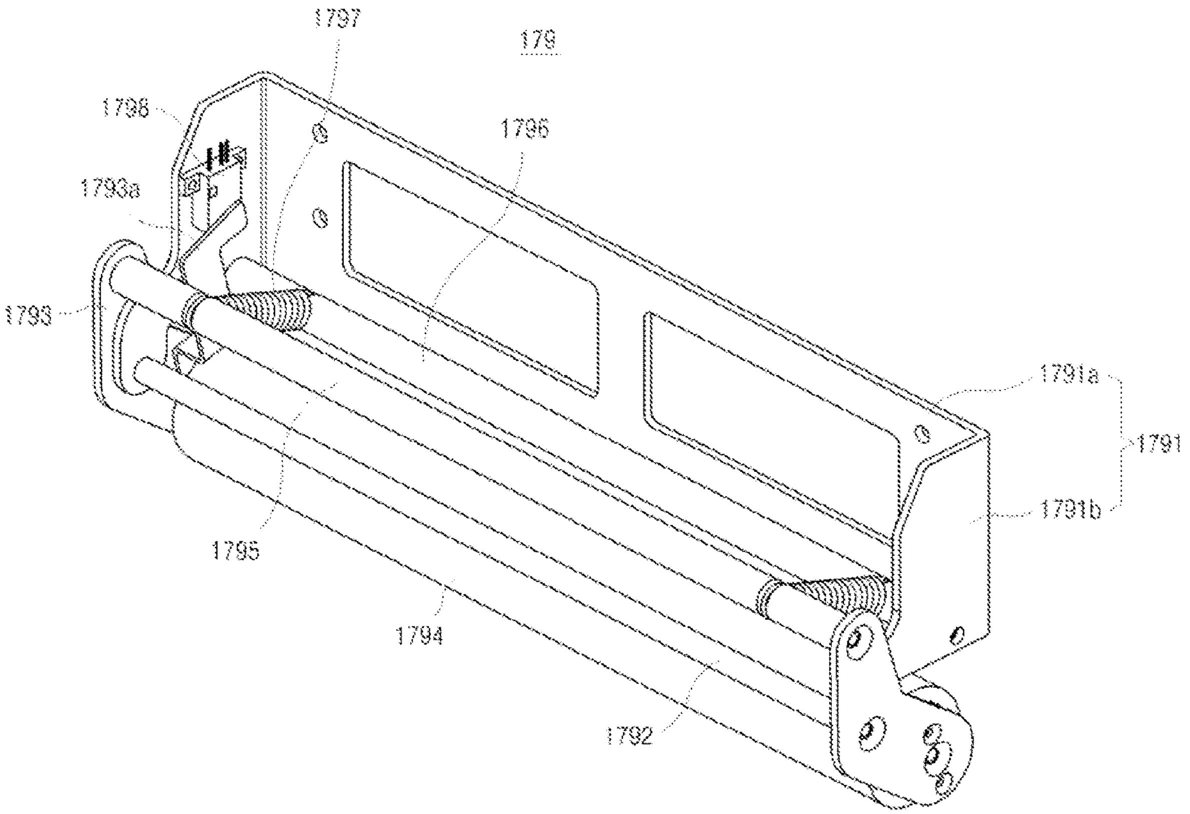
FIG. 10 is a view showing a power transmission unit of a planarizing-pressing unit of the hybrid inkjet printer capable of continuous output according to the present disclosure.
Figure 11:
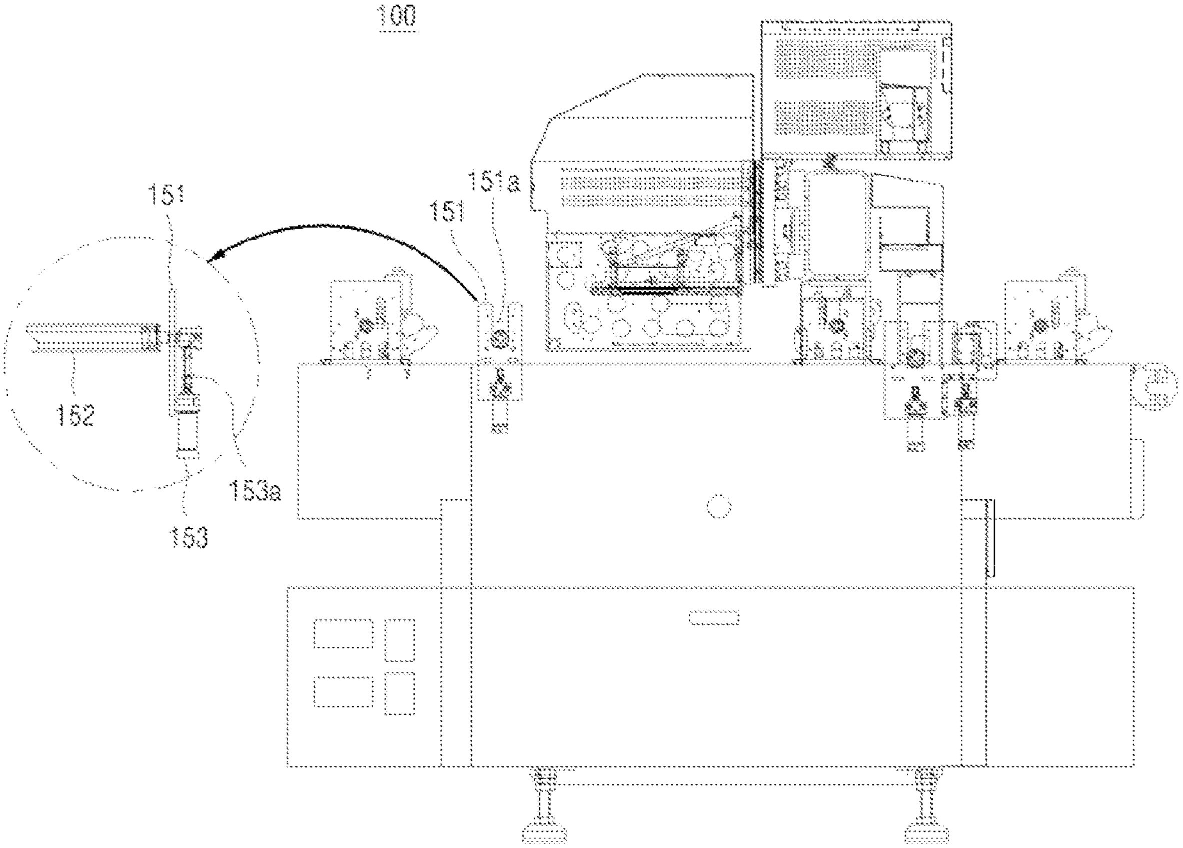
FIG. 11 is a view showing a planarizing-pressing roller unit of the feeding-pressing unit of the hybrid inkjet printer capable of continuous output according to the present disclosure.

Meanwhile, the frame 110, conveying mesh belt 120, vacuum suction unit 125, rail bar 130 for a head, and head unit 140 included in the configuration of the present disclosure are well known, so they are not described in detail, and the setting member 150, feeding-pressing unit 160, planarizing-pressing unit 170, and discharging-pressing unit 180 are described in detail hereafter with reference to FIGS. 1 to 11.

First, the setting member 150 of the hybrid inkjet printer capable of continuous output according to the present disclosure is installed on the top of the frame 110 to be able to move up and down, is positioned at the feed part, and can correspond to extension due to heat while uniformly setting an end of an output medium that is fed.

That is, the setting member 150 includes: setting housings 153 that are installed and fixed at both sides on the top of the frame 110, each have a groove 151*a* on a surface, and each are opened/closed by a cover through a hinge on the top; a setting bar 152 of which a first end and a second end are inserted in the grooves 151*a* of the setting housings 153, respectively, has a setting fixing member 152*b* having a positioning groove 152*a* to receive and lock both inner surfaces of the groove 151*a* on both surfaces of the first end, and has a moving member 152*c* having a flat cross-section to be able to move through the groove 151*a* in correspondence to extension due to heat, which is generated when the inkjet printer is used for a long time, at the second end; and setting cylinders 153 that are fixed to the setting housings 151, respectively, are positioned under the setting fixing member 152*b* and the moving member 152*c* of the setting bar 152, respectively, and each have a setting piston 153 to be able to move the setting bar 152 when controlled to operate by the controller.

The feeding-pressing unit 160 has a first end and a second end installed to be able to move up and down at feeding-fixing members installed at both sides on the top of the frame 110, is positioned ahead of the setting member 150, and is operated to correspond to control of the controller to be able to press the top of an output medium with different pressing forces to correspond to a thin or thick output medium such that an output medium can be stably fed before moving onto the vacuum suction unit 125.

That is, the feeding-pressing unit 160 includes: feeding-moving members 163 of which a first end and a second end are coupled to surfaces of the feeding-fixing members 161, respectively, fixed at both sides on the top of the frame 110 through a pair of LM guides 162 to be able to move up and down; feeding-installation frames 164 of which a first end and a second end are fixed to surfaces of the feeding-moving members 163, respectively; a feeding-driving motor 165 that is installed and fixed on a surface of the feeding-installation frame 164 and has a reducer 165*a* to be able to operate in correspondence to control of the controller; a feeding-driving shaft 166 of which a first end is connected to the reducer 165*a* and a second end at which a feeding-driving gear unit 166*a* is formed to transmit power; a feeding-driven shaft 167 of which a first end is engaged with the feeding-driving gear unit 166*a* of the feeding-driving shaft 166 and a second end is rotatably installed through the feeding-moving members 163 and has a feeding-driven gear unit 167*a* at the end thereof; feeding-rack gear units 168 that are installed and fixed on a surface of each of the feeding-fixing members 161, are engaged with the feeding-driven gear unit 167*a* of the feeding-driven shaft 167, and can move up and down the feeding-moving member 167 to correspond to driving of the feeding-driving motor 165; and feeding-pressing roller units 169 of which first ends are fixed with regular intervals to a surface of the feeding-installation frame 164 and second ends press the top of a fed output medium in correspondence to downward movement of the feeding-moving member 163.

The feeding-pressing roller unit 169 include: a feeding-pressing roller installation member 1691 that has a feeding-pressing roller fixed member 1691*a* fixed to a surface of the feeding-installation frame 164 through a plurality of bolts and nuts and has a feeding-pressing roller bending member 1691*b* extending in one direction and downward from both ends of the feeding-pressing roller fixed member 1691*a*; a feeding-pressing roller rotartion member 1692 that is rotatably connected at a middle portion to the downward-bending portion of the feeding-pressing roller installation member 1691 through a rotation pin and has a feeding-operation pin 1692*a* bending upward on the inner surface; a feeding-pressing roller 1693 that is rotatably installed at a first end of the feeding-pressing roller rotation member 1692 and can press the top of a fed output medium to correspond to downward movement of the feeding-moving member 163; a feeding-tension spring 1696 of which a first end is locked and fixed to a feeding-first locking bar 1694 installed at a second end of the feeding-pressing roller rotation member 1692 and a second end is locked and fixed to a feeding-second locking bar 1695 fixed to the one-direction bending portion of the feeding-pressing roller installation member 1691 to be able to always pull the second end of the feeding-pressing roller rotation member 1692; and a feeding-sensor unit 1697 that is installed and fixed to the one-direction bending portion of the feeding-pressing roller installation member 1691, is operated by approach of the feeding-operation pin 1692*a* to correspond to upward rotation of the first end of the feeding-pressing roller rotation member 1692, and sets an initial pressure of the feeding-pressing roller 1693 when an operation signal is applied to the controller.

That is, the feeding-pressing roller further presses a thick output medium and less presses a thin output medium as the controller controls the driving time of the feeding-driving motor to correspond to the thickness of an output medium that is fed into the feed part so that an output medium can be stably fed to correspond to the thickness of the output medium.

The planarizing-pressing unit 170 has a first end and a second end installed at printing-fixing members installed at both sides on the top of the frame 110 to be able to move up and down, is positioned behind the setting member 150, and presses the top of an output medium, which is being conveyed while the surface thereof is printed by the head unit 140, to correspond to a thickness such that the output medium is planarized and the surface of the output medium can be stably printed.

That is, the feeding-pressing unit 170 includes: planarizing-moving members 173 of which a first end and a second end are coupled to surfaces of the feeding-fixing members 171, respectively, fixed at both sides on the top of the frame 110 through a pair of LM guides 172 to be able to move up and down; feeding-installation frames 174 of which a first end and a second end are fixed to surfaces of the planarizing-moving members 173, respectively; a planarizing-driving motor 175 that is installed and fixed on a surface of the planarizing-installation frame 174 and has a planarizing-reducer 175*a* to be able to operate in correspondence to control of the controller; a planarizing-driving shaft 176 of which a first end is connected to the planarizing-reducer 175*a* and a second end at which a planarizing-driving gear unit 176*a* is formed to transmit power; a planarizing-driven shaft 176 of which an end is engaged with the planarizing-driving gear unit 176*a* of the feeding-driving shaft 177 and another end is rotatably installed through the planarizing-moving members 173 and has a planarizing-driven gear unit 177*a* at the end thereof; planarizing-rack gear units 178 that are installed and fixed on a surface of each of the planarizing-fixing members 171, are engaged with the planarizing-driven gear unit 177*a* of the planarizing-driven shaft 177, and can move up and down the planarizing-moving member 173 to correspond to driving of the feeding-driving motor 175; and planarizing-pressing roller units 179 of which first ends are fixed with regular intervals to a surface of the planarizing-installation frame 174 and second ends press the top of a fed output medium in correspondence to downward movement of the planarizing-moving member 173.

The planarizing-pressing roller unit 179 includes: a planarizing-pressing roller installation member 1791 that has a planarizing-pressing roller fixed member 1791*a* fixed to a surface of the planarizing-installation frame 174 through a plurality of bolts and nuts and has a planarizing-pressing roller bending member 1791*b* bending in one direction from both ends of the planarizing-pressing roller fixed member; a planarizing-pressing roller rotartion member 1793 that is rotatably connected at the middle portion to the planarizing-pressing roller bending member 1791*b* of the planarizing-pressing roller installation member 1791 through a rotation bar 1792 and has a planarizing-operation pin 1793*a* bending upward on the inner surface; a planarizing-pressing roller 1794 that is rotatably installed at a first end of the planarizing-pressing roller rotation member 1793 and has a width larger than the feeding-pressing roller 1693 to be able to press and planarize a surface of a fed output medium to correspond to downward movement of the planarizing-moving member; a pair of planarizing-tension springs 1797 of which first ends are locked and fixed to both ends of a rotation-locking bar 1795 installed at a second end of the planarizing-pressing roller rotation member 1793, respectively, and second ends are locked and fixed to both ends of a fixing-locking bar 1796 fixed to a planarizing-pressing roller bending member 1791*b* of the planarizing-pressing roller installation member 1791 to be able to always pull the second end of the planarizing-pressing roller rotation member 1793; and a feeding-sensor unit 1798 that is installed and fixed on the inner surface of the planarizing-pressing roller bending member 1791*b* of the planarizing-pressing roller installation member 1791, is operated by approach of the planarizing-operation pin 1793*a* to correspond to upward rotation of the first end of the planarizing-pressing roller rotation member 1793, and sets initial pressure of the planarizing-pressing roller 1794 when an operation signal is applied to the controller.

The discharging-pressing unit 180 has a first end and a second end installed to be able to move up and down at discharge-fixing members installed at both sides on the top of the frame 110, is positioned at the discharge part, presses the top of an output medium to correspond to a thickness until the output medium is completely discharged after passing the vacuum suction unit 125 while the surface of the output medium finishes being printed such that the output medium can be stably discharged. This is the same configuration as the feeding-pressing unit 160 and is not described in detail.

When an output medium is printed with a thickness of 0.2 mm by the hybrid inkjet printer capable of continuous output according to the present disclosure, as shown in FIGS. 1 to 11, first, the contents to be printed and the thickness of an output medium are input through a display unit of the controller.

Thereafter, a first end of the output medium is fed into the feed part to come in contact with the front surface of the setting bar 152 of the setting member 150, whereby it is set.

When the output medium is set at the setting bar 152 of the setting member 150 a user presses the foot switch with a foot.

As the foot switch is pressed, the feeding-driving motor 165 of the feeding-pressing unit 160 is driven by control of the controller.

When the feeding-moving member 163 is moved downward by the feeding-driving motor 165, the feeding-pressing rollers 1693 of the feeding-pressing roller unit 169 installed with regular intervals on the front surface of the feeding-installation frame 164 are positioned on the top of an output medium.

When the feeding-sensor unit 1697 senses the feeding-operation pin 1692*a* while the feeding-pressing rollers 1693 are positioned on the top of the output medium, this is applied to the controller and the feeding-driving motor 165 stops by control of the controller.

Stop of the feeding-driving motor 165 means that the output medium is not fed yet, and when the feeding-driving motor 165 is stopped, the controller drives the feeding-driving motor 165 for several seconds to correspond to the pre-input thickness of the output medium.

Accordingly, the feeding-pressing rollers 1693 press the top of the output medium.

When the feeding-pressing rollers 1693 press the top of the output medium, as described above, the setting bar 152 of the setting member 150 is moved up by control of the controller.

When the setting bar 152 of the setting member 150 is moved up, the conveying mesh belt 120 is moved to correspond to driving of the driving motor by control of the controller, whereby the output medium is conveyed under the rail bar 130 for a head.

When the output medium is conveyed under the rail bar 130 for a head, the planarizing-driving motor 175 of the feeding-pressing unit 170 is driven by control of the controller.

When the planarizing-driving motor 175 is driven, the planarizing-pressing roller 1794 of the planarizing-pressing roller unit 179 presses the surface of the conveyed output medium in the same order of the operation order of the feeding-pressing unit 160.

Accordingly, the output medium is conveyed to the discharge part while being planarized, and the head unit 140 prints the surface of the output medium while straightly reciprocating along the rail bar 130 for a head by control of the controller while the output medium is conveyed to the discharge part.

As described, when the output medium is conveyed to the discharge part, the discharging-pressing unit 180 presses the surface of the conveyed output medium in the same order of the operation order of the feeding-pressing unit 160 by the controller.

Accordingly, the output medium finishes being printed on the surface while being stably conveyed.

As described above, since an output medium is printed while be stably moved by the feeding-pressing unit and the planarizing-pressing unit installed on the top of the conveying mesh belt, a poor quality ratio in printing can be reduced.

The above description merely explains the spirit of the present disclosure and the present disclosure may be changed and modified in various ways without departing from the spirit of the present disclosure by those skilled in the art. Accordingly, the embodiments described herein are provided merely not to limit, but to explain the spirit of the present disclosure, and the spirit of the present disclosure is not limited by the embodiments. The protective range of the present disclosure should be construed by the following claims and the scope and spirit of the present disclosure should be construed as being included in the patent right of the present disclosure.

What is claimed is:

1. A hybrid inkjet printer capable of continuous output, comprising: a frame that is horizontally installed on a floor to set another output medium while an output medium is being printed such that the set output medium can be continuously automatically printed simultaneously with completion of printing of the output medium that is being printed; a conveying mesh belt that is wound on a pair of conveying rollers spaced apart from each other and being rotated by a driving motor over the frame and is provided to convey an output medium that is fed to be printed on a surface; a vacuum suction unit that is installed under the conveying mesh belt, is positioned between the conveying rollers, and being able to vacuum-suction an output medium that is conveyed by a vacuum generator that is controlled to operate by a controller; a rail bar for a head that is fixed to the front and rear ends of the frame at a first end and a second end, is longitudinally installed at a predetermined distance from the top of the conveying mesh belt, and can be divided into a feed part and a discharge part of an output medium; a head unit that is installed at the rail bar for a head and can print a surface of an output unit while straightly reciprocating along the rail bar for a head to correspond to information input through a display unit; a setting member that is installed on the top of the frame to be able to move up and down, is positioned at the feed part, and can correspond to extension due to heat while uniformly setting an end of an output medium that is fed; a feeding-pressing unit that is installed on the top of the frame to be able to move up and down, is positioned ahead of the setting member, and is operated to correspond to control of the controller to operate and press the top of an output medium when a foot switch is pressed such that the output unit can be stably fed before moving onto the vacuum suction unit; a planarizing-pressing unit that is installed on the top of the frame to be able to move up and down, is positioned behind the setting member, and presses the top of an output medium, which is being conveyed while the surface thereof is printed by the head unit, to correspond to a thickness such that the output medium is planarized and the surface of the output medium can be stably printed; and a discharging-pressing unit that is installed on the top of the frame to be able to move up and down, is positioned at the discharge part, and presses the top of an output medium to correspond to a thickness until the output medium is completely discharged after passing the vacuum suction unit while the surface of the output medium finishes being printed such that the output medium can be stably discharged.

2. The hybrid inkjet printer of claim 1, further comprising a feeding-tension roller of which a first end and a second end are connected to feeding-operation cylinders installed at both sides on the top of the frame to be positioned between the setting member and the planarizing-pressing unit to move up and down and press a fed output medium to correspond to driving of the feeding-operation cylinders such that the output medium is fed always in a tensioned state and poor printing can be minimized.

3. The hybrid inkjet printer of claim 1, further comprising a discharging-tension roller of which an end and another end are connected to discharging-operation cylinders installed at both sides on the top of the frame to be positioned at a side of the discharging-pressing unit to move up and down and press an output medium, which is discharged, to correspond to driving of the discharging-operation cylinders such that the output medium can be discharged always in a tensioned state.

4. The hybrid inkjet printer of claim 1, wherein the setting member includes: setting housings that are installed and fixed at both sides on the top of the frame, each having a groove on a surface, and each are opened/closed by a cover through a hinge on the top; a setting bar of which a first end and a second end are inserted in the grooves of the setting housings, respectively, having a setting fixing member with a positioning groove to receive and lock both inner surfaces of the groove on both surfaces of the first end, and having a moving member including a flat cross-section to be able to move through the groove in correspondence to extension due to heat, which is generated when the inkjet printer is used for a long time, at the second end; and setting cylinders that are fixed to the setting housings, respectively, are positioned under the setting fixing member and the moving member of the setting bar, respectively, and each having a setting piston to be able to move the setting bar when controlled to operate by the controller.

5. The hybrid inkjet printer of claim 1, wherein the feeding-pressing unit includes: feeding-moving members of which a first end and a second end are coupled to surfaces of the feeding-fixing members, respectively, fixed at both sides on the top of the frame through a pair of LM guides to be able to move up and down; feeding-installation frames of which a first end and a second end are fixed to surfaces of the feeding-moving members, respectively; a feeding-driving motor that is installed and fixed on a surface of the feeding-installation frame and has a reducer to be able to operate in correspondence to control of the controller; a feeding-driving shaft 166 of which a first end is connected to the reducer and a second end at which a feeding-driving gear unit is formed to transmit power; a feeding-driven shaft of which a first end is engaged with the feeding-driving gear unit of the feeding-driving shaft and a second end is rotatably installed through the feeding-moving members and has a feeding-driven gear unit at the end thereof; feeding-rack gear units that are installed and fixed on a surface of each of the feeding-fixing members, are engaged with the feeding-driven gear unit of the feeding-driven shaft, and can move up and down the feeding-moving member to correspond to driving of the feeding-driving motor; and feeding-pressing roller units of which first ends are fixed with regular intervals to a surface of the feeding-installation frame and second ends press the top of a fed output medium in correspondence to downward movement of the feeding-moving member.

6. The hybrid inkjet printer of claim 5, wherein the feeding-pressing roller unit include: a feeding-pressing roller installation member that has a feeding-pressing roller fixed member fixed to a surface of the feeding-installation frame and has a feeding-pressing roller bending member extending in one direction and downward from both ends of the feeding-pressing roller fixed member; a feeding-pressing roller rotartion member that is rotatably connected at a middle portion to the downward-bending portion of the feeding-pressing roller installation member through a rotation pin and has a feeding-operation pin bending upward on the inner surface; a feeding-pressing roller that is rotatably installed at a first end of the feeding-pressing roller rotation member and can press the top of a fed output medium to correspond to downward movement of the feeding-moving member; a feeding-tension spring of which a first end is locked and fixed to a feeding-first locking bar installed at a second end of the feeding-pressing roller rotation member and a second end is locked and fixed to a feeding-second locking bar fixed to the one-direction bending portion of the feeding-pressing roller installation member to be able to always pull the second end of the feeding-pressing roller rotation member; and a feeding-sensor unit that is installed and fixed to the one-direction bending portion of the feeding-pressing roller installation member, is operated by approach of the feeding-operation pin to correspond to upward rotation of the first end of the feeding-pressing roller rotation member, and sets an initial pressure of the feeding-pressing roller when an operation signal is applied to the controller.

* * * * *